(12) United States Patent
Brandon

(10) Patent No.: US 8,671,574 B2
(45) Date of Patent: Mar. 18, 2014

(54) DEVICE FOR MOUNTING DEALER TAGS

(76) Inventor: Dennis Brandon, Brentwood, TN (US)

(*) Notice: Subject to any disclaimer, the term of this patent is extended or adjusted under 35 U.S.C. 154(b) by 39 days.

(21) Appl. No.: 13/187,415

(22) Filed: Jul. 20, 2011

(65) Prior Publication Data

US 2012/0090148 A1  Apr. 19, 2012

Related U.S. Application Data

(60) Provisional application No. 61/366,038, filed on Jul. 20, 2010.

(51) Int. Cl.
*B21D 53/88* (2006.01)

(52) U.S. Cl.
USPC ............ 29/897.2; 29/897; 40/200; 40/202; 40/209; 40/643; 40/644

(58) Field of Classification Search
USPC .......... 29/897, 897.2; 40/200, 202, 209, 591, 40/643, 644
See application file for complete search history.

(56) References Cited

U.S. PATENT DOCUMENTS

| | | | | | |
|---|---|---|---|---|---|
| 1,436,358 | A | * | 11/1922 | Rinebold | 40/202 |
| 2,326,566 | A | * | 8/1943 | Ritchie | 40/202 |

* cited by examiner

*Primary Examiner* — Richard Chang
(74) *Attorney, Agent, or Firm* — Wayne Edward Ramage; Baker Donelson

(57) ABSTRACT

An apparatus for removably attaching dealer tags to various vehicles, comprising two or more mounting devices, each comprising a center portion with a mounting hole for mounting the device on the vehicle's tag or license mounting structure using a screw or bolt or similar mounting means. At one end of the device is a mounting post supported by a mounting post support with a ridge, protrusion, or indentation on two opposing sides. The mounting post support is flexibly attached to the center portion, and can be bent around and removably attached to the center portion by means of inserting the ridge or protrusions into corresponding holes or slots in the sides of the center portion. The other end of the device comprises a flexible arm or structure with a hole adapted to fit over the mounting post. The user causes the mounting post to be attached to the center portion, inserts the mounting post through a corresponding hole in the driver tag, then bends the flexible arm around to fit the snap-lock hole over the mounting post and hold the driver tag in place. Removal is accomplished by reversing these steps.

6 Claims, 3 Drawing Sheets

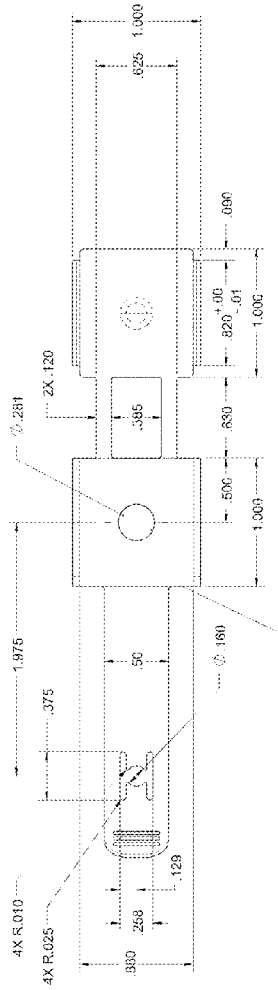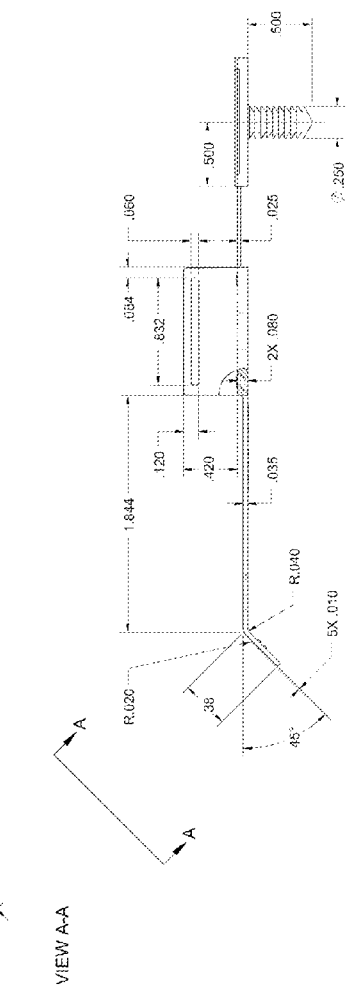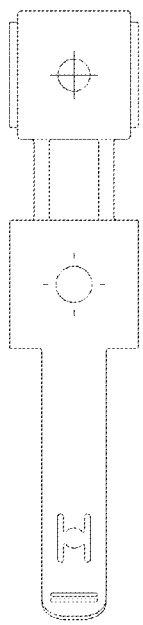
FIGURE 3
FIGURE 4
FIGURE 5
FIGURE 6
FIGURE 7

DEVICE FOR MOUNTING DEALER TAGS

This application claims benefit of and priority to U.S. Provisional Application No. 61/366,038 filed Jul. 20, 2010, by Dennis Brandon, and is entitled to that filing date for priority. The specification, figures and complete disclosure of U.S. Provisional Application No. 61/366,038 are incorporated herein by specific reference for all purposes.

FIELD OF INVENTION

This invention relates to a device for removably attaching dealer tags to various vehicles.

BACKGROUND OF THE INVENTION

Automobile dealers are required to attach temporary dealer tags or license plates to vehicles for customer demonstration or other purposes. A dealer tag may be mounted liked a permanent license plate with the use of tools like a screwdriver or wrench, but this is time-consuming and difficult, and requires the potential customer to wait for an extended period of time. Some dealers place or tape the dealer tag inside the rear window of the vehicle, although this is prohibited by many states, and several states require that a temporary tag be mounted in the exact location as the permanent license plate. Other dealers may use magnets to attach the dealer tag to the trunk or rear body of the vehicle. However, this is not permitted in states where the dealer tag must be mounted in the exact location as the permanent license plate, the tag may be easily lost while driving, and the vehicle's paint can be scratched. Accordingly, what is needed is an easy and quick way to removably attach dealer tags to any vehicle without the use of tools.

SUMMARY OF INVENTION

In various embodiments, the present invention comprises a tag mounting device comprising a center portion with a mounting hole for mounting the device on the vehicle's tag or license mounting structure using a screw or bolt or similar mounting means. In one embodiment, two or more mounting devices are used for a single vehicle.

At one end of the device is a mounting post supported by a mounting post support with a ridge, protrusion, or indentation on two opposing sides. The mounting post support is flexibly attached to the center portion, and can be bent around and removably attached to the center portion by means of inserting the ridge or protrusions into corresponding holes or slots in the sides of the center portion.

The other end of the device comprises a flexible arm or structure with a hole adapted to fit over the mounting post (i.e., as in a snap-lock fit). The mounting post is threaded, ridged, or serrated. The end of the flexible arm may be angled so as to facilitate removal (i.e., the user pushes down or pulls up on the end to cause the snap-lock to release).

To attach a dealer tag, the user causes the mounting post to be attached to the center portion, inserts the mounting post through a corresponding hole in the driver tag, then bends the flexible arm around to fit the snap-lock hole over the mounting post and hold the driver tag in place. Removal is accomplished by reversing these steps.

The height of the sides of the center portion may vary to accommodate different models of vehicles. The devices may be made of any suitable material, including, but not limited to, plastic. The center portion, mounting post and support, and snap-lock fit arm may be separate from each other, although a unitary device as shown in the figures has the advantage of not having separate parts that can be lost. Once mounted on a vehicle, the user does not have to worry about any part being lost.

In another exemplary embodiment, an all-thread or double-sided screw or bolt may be used, along with a wing net or similar device. The screw or bolt is mounted on the vehicle's mounting structure, and the driver tag may be easily mounted or removed over the exposed end and held in place with a wing nut, or similar hand-fastening device. In one embodiment, a snap-lock structure as described above may be used.

In yet another exemplary embodiment, the present invention comprises a license plate frame with a slot or slots in the lower frame to hold the bottom portion of the dealer tag. A snap-lock mechanism or spring is located on the upper portion of the frame to hold the top of the dealer tag in place. Advertising may be displayed on the frame.

In yet another embodiment, the present invention comprises a plastic device that is mounted on the vehicle's mounting structure using the existing mounting holes (as described above). The outer part of the device comprises a structure that snap-locks through the mounting holes in the dealer tag. Two of these devices may be used per vehicle. In one configuration, an offset for the snap-lock feature may be required.

DESCRIPTION OF THE DRAWINGS

FIGS. 3-7 shows different views of the device of FIG. 1.

DETAILED DESCRIPTION OF EXEMPLARY EMBODIMENTS

Figure 1:
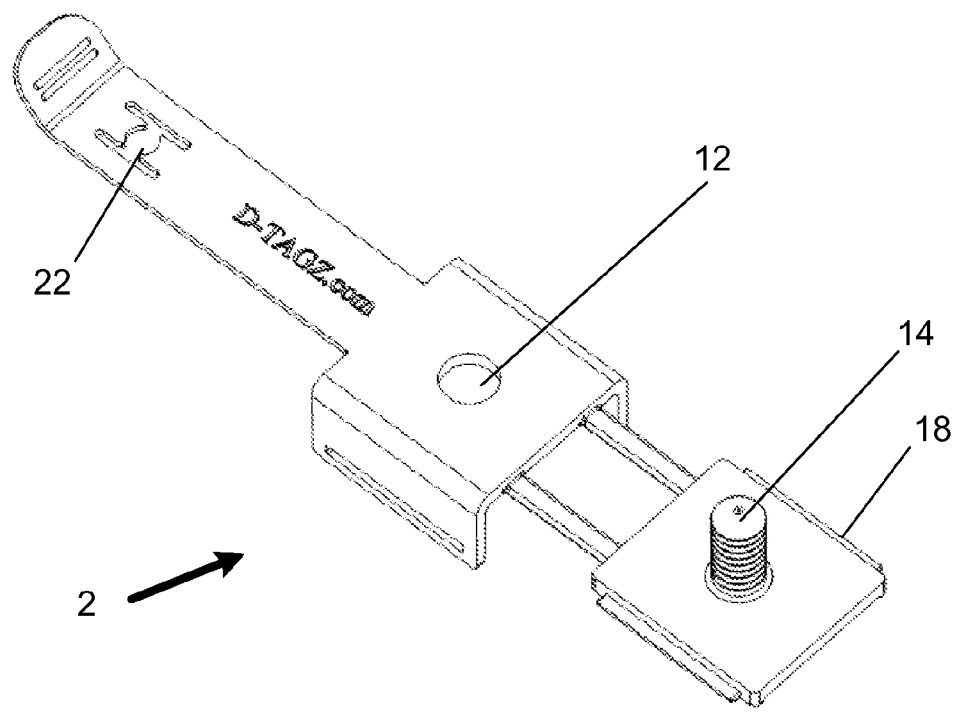
FIGS. 1-2 shows perspective views of a device in accordance with an embodiment of the present invention.
Figure 2:
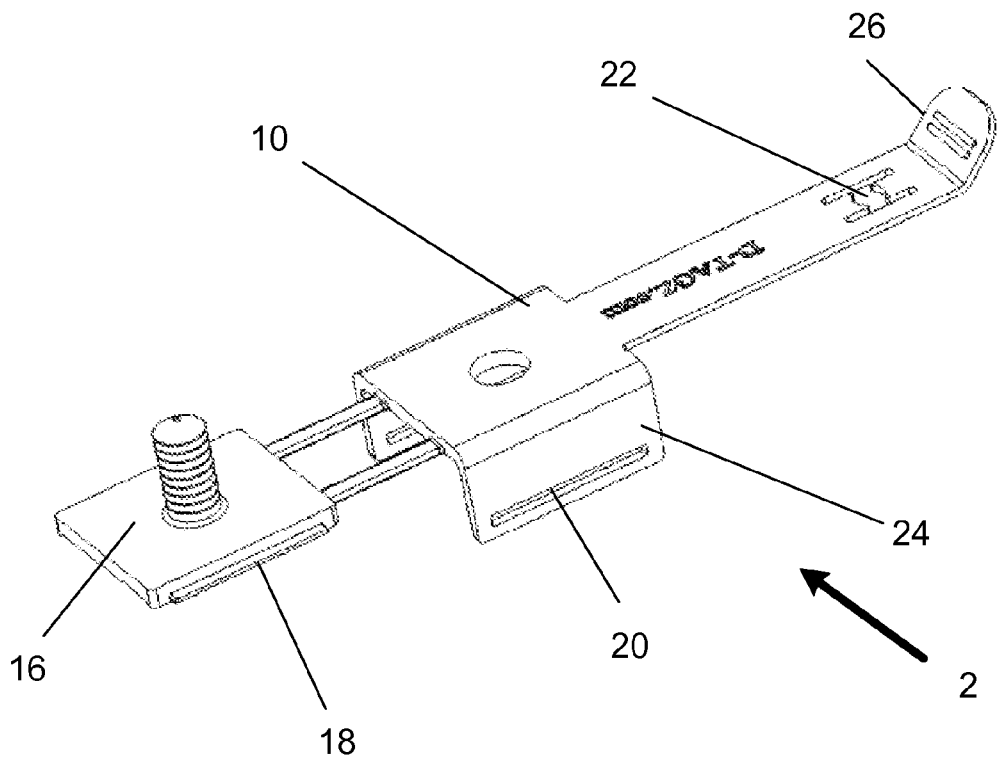
Figure 8:
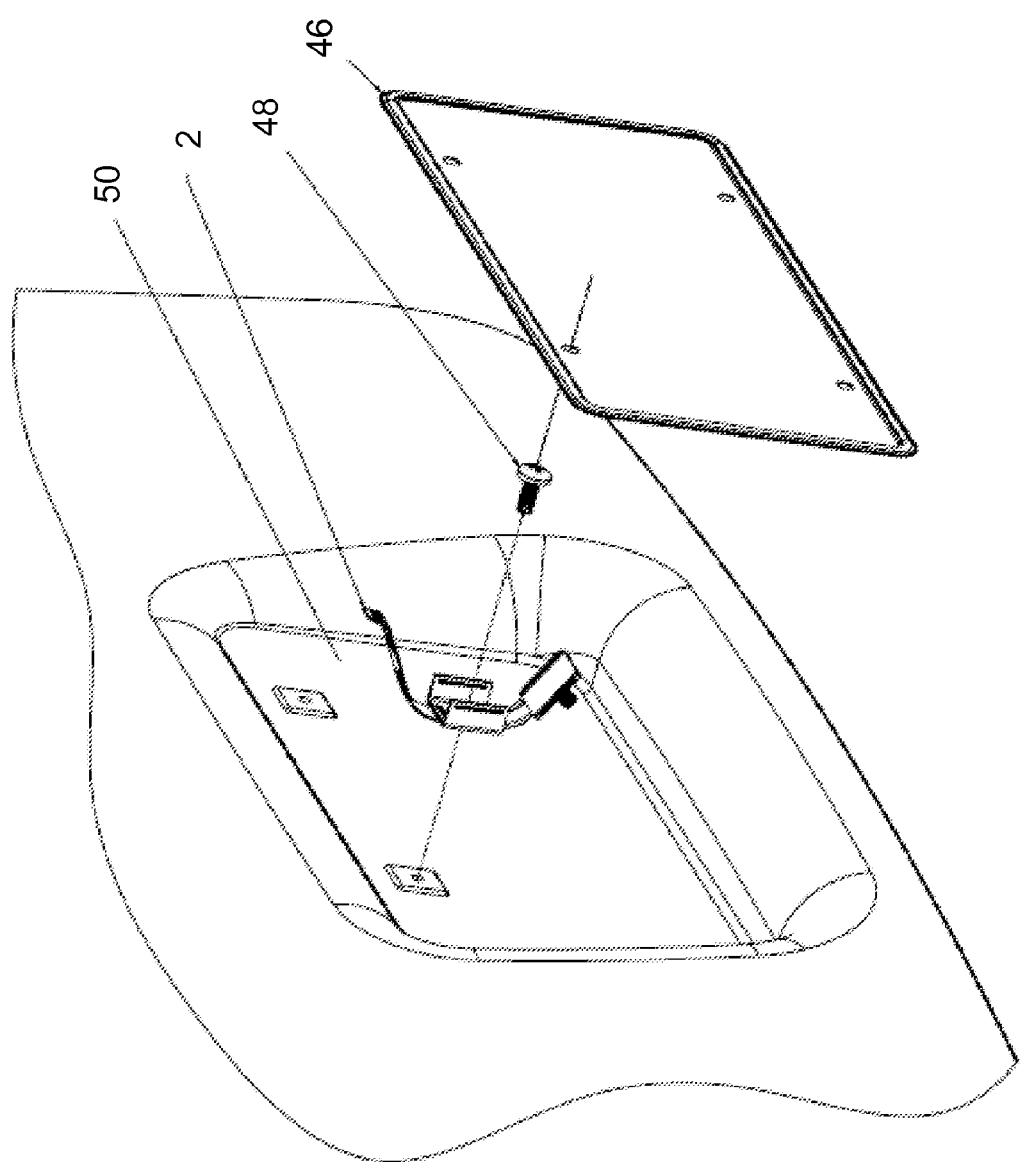
FIG. 8 shows a view of the device of FIG. 1 being used to mount a dealer plate or tag.
Figure 9:
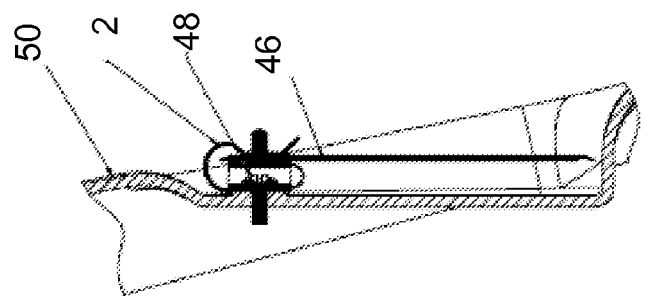
FIG. 9 shows a side view of the device of FIG. 1 with a dealer plate or tag mounted.

In one exemplary embodiment, as shown in FIGS. 1-7, the present invention comprises a tag mounting device 2. The center portion 10 comprises a mounting hole 12 for mounting the device on the vehicle's tag or license mounting structure 50 using a screw or bolt 48 or similar mounting means. In one embodiment, two or more mounting devices are used for a single vehicle.

At one end of the device is a mounting post 14 supported by a mounting post base 16. The base may have a ridge, protrusion, or indentation 18 on one side or end, or on two opposing sides. The mounting post support is flexibly attached to the center portion 10, and can be bent around and removably attached to the center portion by means of inserting the ridge or protrusions 18 into corresponding holes or slots 20 in the sides (receiving structures) 24 of the center portion. A receiving structure also may extend upwards from the side of the center portion opposite the post end.

The other end of the device comprises a flexible arm or structure with a receiving slot or hole 22 adapted to fit over the mounting post 14 (i.e., as in a snap-lock fit). The mounting post may threaded, ridged, or serrated. The end of the flexible arm may be angled 26 so as to facilitate removal (i.e., the user pushes down or pulls up on the end to cause the snap-lock to release).

To attach a dealer tag 46, the user causes the mounting post to be attached to the center portion, inserts the mounting post through a corresponding hole in the driver tag, then bends the other flexible arm around to fit the snap-lock hole or slot 22 over the mounting post and hold the dealer tag or plate 46 in place, as seen in figure. Removal is accomplished by reversing these steps.

The height of the sides 24 of the center portion may vary to accommodate different models of vehicles. The devices may be made of any suitable material, including, but not limited to, plastic. The center portion, mounting post and support, and snap-lock fit arm may be separate from each other, in whole or in part, although a unitary device as shown in the figures has the advantage of not having separate parts that can be lost. Once mounted on a vehicle, the user does not have to worry about any part being lost.

In another exemplary embodiment, an all-thread or double-sided screw or bolt may be used, along with a wing net or similar device. The screw or bolt is mounted on the vehicle's mounting structure, and the driver tag may be easily mounted or removed over the exposed end and held in place with a wing nut, or similar hand-fastening device. In one embodiment, a snap-lock structure as described above may be used.

In yet another exemplary embodiment, the present invention comprises a license plate frame with a slot or slots in the lower frame to hold the bottom portion of the dealer tag. A snap-lock mechanism or spring is located on the upper portion of the frame to hold the top of the dealer tag in place. Advertising may be displayed on the frame.

In yet another embodiment, the present invention comprises a plastic device that is mounted on the vehicle's mounting structure using the existing mounting holes (as described above). The outer part of the device comprises a structure that snap-locks through the mounting holes in the dealer tag. Two of these devices may be used per vehicle. In one configuration, an offset for the snap-lock feature may be required.

In another alternative embodiment, the invention comprises comprising a pair of matching magnets (i.e., one positive, one negative). One magnet of each pair is attached to the head of a bolt or screw that is screwed into the license plate mounting holes on the vehicle's mounting structure. The matching magnet (of opposite polarity) is attached to back of the dealer license plate (temporary tag), which typically is made from a nonmagnetic material. This may be done through the top mounting holes in the dealer license plate, such as by a magnet-headed bolt that passes through the hole and is held in place by a nut on the other side.

In a preferred embodiment, two sets of the apparatus are used (i.e., a total of four magnets) along the top of the dealer plate, two inserted in the mounting structure, with matching magnets attached to the dealer plate, which can be easily attached or removed from the vehicle by sufficient force. The magnets are strong enough to hold the plate in place during normal use. In one embodiment, the magnets used with the vehicle-mounted bolts are all of one polarity, and the magnets attached to the dealer plate are all of the opposite polarity.

Thus, it should be understood that the embodiments and examples described herein have been chosen and described in order to best illustrate the principles of the invention and its practical applications to thereby enable one of ordinary skill in the art to best utilize the invention in various embodiments and with various modifications as are suited for particular uses contemplated. Even though specific embodiments of this invention have been described, they are not to be taken as exhaustive. There are several variations that will be apparent to those skilled in the art.

What is claimed is:

1. A device for mounting plates on a motor vehicle, comprising:
    an elongated mounting strip with a center portion, a first end and a second end, wherein the center portion has a vehicle side and an outward side and a center hole for attaching the strip to a vehicle or vehicle mounting structure, further wherein the first end is flexibly attached to the center portion, and the second end is flexibly attached to the center portion;
    a post extending from one side of the first end of the strip; and
    a receiving slot or hole in the second end of the strip;
    wherein the first end can be bent to meet the center portion so the post extends outward opposite the vehicle side, and the second end can be bent to be fastened on the post;
    further wherein the post is ridged or threaded on its sides, in whole or in part, and the receiving hole or slot is adapted to engage the ridges or threads on the post when pushed over the post.

2. The device of claim 1, wherein the device is attached to a vehicle or vehicle mounting structure by a screw or bolt inserted through the center hole.

3. The device of claim 1, wherein the second end can be unfastened from the post.

4. A device for mounting plates on a motor vehicle, comprising:
    an elongated mounting strip with a center portion, a first end and a second end, wherein the center portion has a vehicle side and an outward side and a center hole for attaching the strip to a vehicle or vehicle mounting structure, further wherein the first end is flexibly attached to the center portion, and the second end is flexibly attached to the center portion;
    a post extending from one side of the first end of the strip; and
    a receiving slot or hole in the second end of the strip;
    wherein the first end can be bent to meet and lock onto the center portion so the post extends outward opposite the vehicle side, and the second end can be bent to be fastened on the post.

5. A device for mounting plates on a motor vehicle, comprising:
    an elongated mounting strip with a center portion, a first end and a second end, wherein the center portion has a vehicle side and an outward side and a center hole for attaching the strip to a vehicle or vehicle mounting structure, further wherein the first end is flexibly attached to the center portion, and the second end is flexibly attached to the center portion;
    a post extending from one side of the first end of the strip; and
    a receiving slot or hole in the second end of the strip;
    wherein the first end can be bent to meet the center portion so the post extends outward opposite the vehicle side, and the second end can be bent to be fastened on the post;
    further wherein the center portion comprises two snap-lock receiving structures with slots.

6. The device of claim 5, wherein the receiving structures extend outward from the center portion opposite the vehicle side.

\* \* \* \* \*